F. B. Marden.
Potato-Planter, Hoe & Digger.
N° 73618. Patented Jan. 21, 1868.
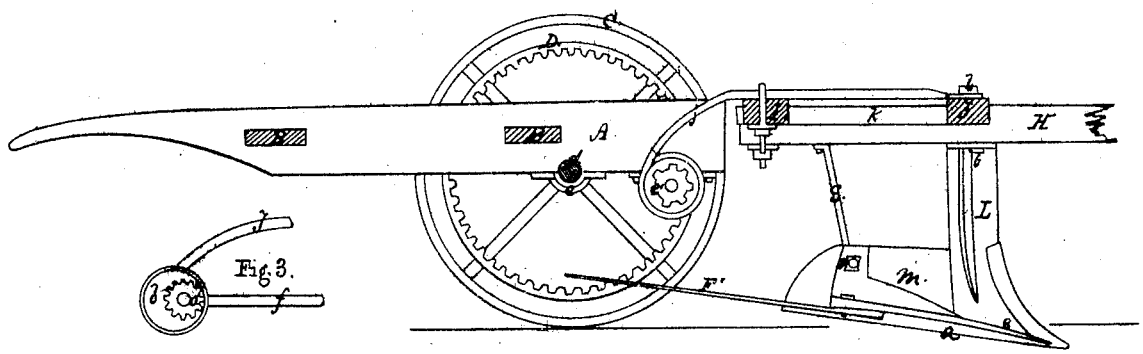
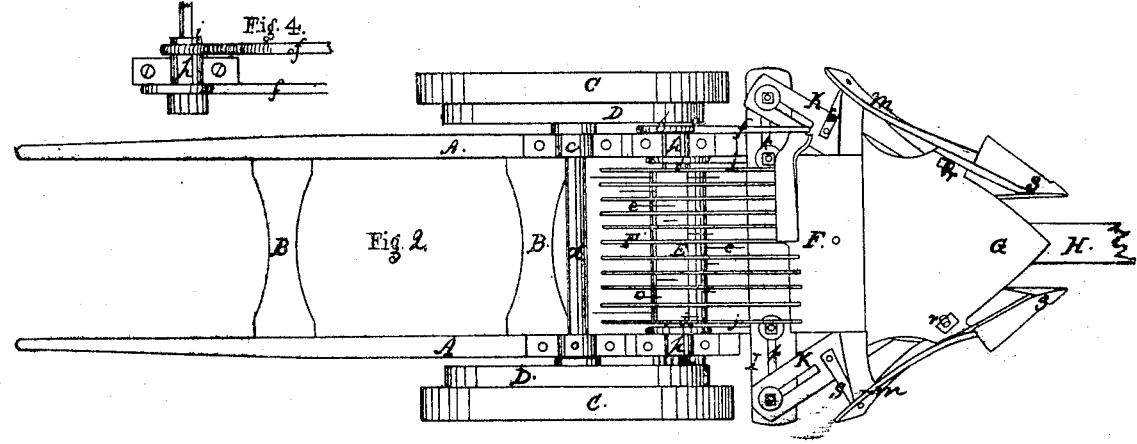
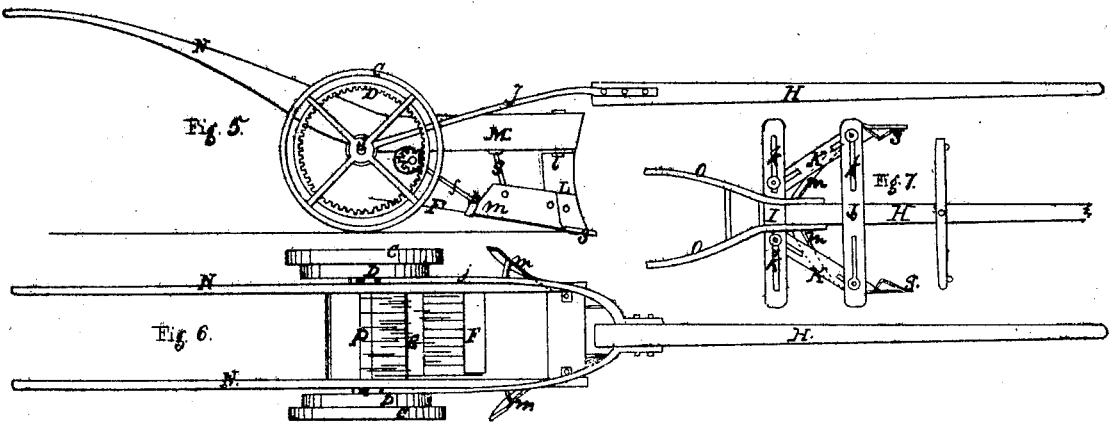
Witnesses.
J. B. Woodruff
Geo. C. Green
Inventor.
Francis B. Marden

UNITED STATES PATENT OFFICE.

FRANCIS B. MARDEN, OF BANGOR, MAINE.

IMPROVEMENT IN COMBINED POTATO-PLANTER, HOE, AND POTATO-DIGGER.

Specification forming part of Letters Patent No. 73,618, dated January 21, 1868.

*To all whom it may concern:*

Be it known that I, FRANCIS B. MARDEN, of Bangor, in the county of Penobscot, in the State of Maine, have invented certain new and useful Improvements in Agricultural Implements, which is a Combined Potato-Planter, Hoe, and Potato-Digger; and the following is a full, clear, and exact description of the same, reference being had to the accompanying drawings, making a part of this specification, in which—

Figure 1 represents a section through a side elevation of the potato-digger. Fig. 2 shows an under side view of the same. Fig. 3 shows a detached view of the eccentric shaft, pinion, and hanger-iron. Fig. 4 represents a journal-box for pinion-shaft, with projections forming an axle for the hanging irons connecting the driving-wheels with the hoe. Fig. 5 represents a side view of the simplified mode of constructing the frame for the potato-digger. Fig. 6 shows an under side or bottom view of the same. Fig. 7 represents a plan or top view of the potato-planter and horse-hoe detached.

The object of my invention is to combine, in one agricultural implement, a practical and efficient potato-planter, hoe, and digger; and it consists in the arrangement of the adjustable frame for connecting the right and left plow-points on the hoe and mold-boards; and also the method of attaching the digging shovel point to the mold-boards by four bolts; also, the mode of operating the shaker, as arranged and combined with the finger-reel and comb; likewise, the method of attaching the planter and hoe to the projections on the pinion journal-boxes.

My invention furthermore consists in the simplified mode of constructing the frame, as shown in the Figs. 5 and 6, to which are attached the digger, finger-reel, and comb; as also in the form and construction and the mode of attaching the standards and points, so that they may run in nearly a direct line with the pole, when arranged as either planter, hoe, or digger.

To enable others to make, change, and use my improved potato-planter, hoe, and digger, I will describe it more fully, referring to the drawings.

The frame for controlling the operating parts of the potato-digger, when connected with the machinery for liberating the potato-tops, grass, weeds, and other extraneous matter, is made of any suitable hard wood, with side pieces A A, connected with cross-bars B B, and mounted on two wheels, C C, in the manner of an ordinary truck or hand-barrow, the rear ends of the side pieces A A being formed into handles similar to the truck, so that the operator can, by them, control the depth of the digging-points. The wheels C C may be of any desired dimensions, they being provided with internal spur-gear wheels D D, into which the pinions *a a* operate to give motion to the finger-reel E on one side, and the eccentric *b* on the other, which operates the shaker F by means of the connecting-rod *f*. The driving-wheels C C may have rib projections on the periphery, if found requisite, similar to the driving-wheels of reaping or mowing machines, they being connected to both ends of the shaft *d*, outside of the side pieces A A, the shaft *d* being supported in metal journal-boxes *c c* on the under side, so that, by the raising or falling of the handles, the points G and *g g* are sunk in the earth, or lifted out of it to pass over any obstruction. The reel-cylinder E, which is provided with a series of spiral rows of metal curved fingers, *e e e e*, has its journals fitted to metal boxes *h h*, which are also secured to the under side of the handle side pieces A A, in such position as to have the pinions *a a* work in the gear-wheels D D. The metal boxes *h h*, having projections *i i*, which form the axles on which the draft-irons *j j* are hitched to connect the pole or tongue H and cross-bars I and J, they having slots *k k*, as well as the braces K K, for attaching, by bolts *l l*, the standard-points L L, to which the mold-boards *m m* are secured, so that the position of the points can be varied in width to suit any desired mode of digging, planting, hoeing, or cultivating the crop at its various stages of growth, or the points and mold-boards may be reversed, as shown in Fig. 7.

For planting or hoeing potatoes, the digging apparatus is detached, and a pair of crooked handles, *o o*, are bolted onto the rear end of the tongue or pole H, as seen in Fig. 7, and the points L L may be so adjusted, by changing their position by means of the slots k k in the cross-bars I and J, that any portion of the earth within their limits may be acted on, while at the same time the points may run in nearly a direct line with the pole. When the two parts, the part that contains the pole H, slotted cross-bars I and J, braces K K, standard-points L L, and mold-boards m m, and the digger-point G, are connected by the irons j j with the rear frame, wheels, finger-reel, and comb B, the shaker F being connected so as to be operated by the rod f and eccentric b, as shown in Figs. 1, 2, the machine is then complete for a potato-digger, the plow-points removing the earth from the sides of the rows, the shovel-point G passing under the roots, the potatoes and tops falling on the shaker, and are brought in contact with the fingers e e e of the reel, where the tops are separated from the potatoes, and the potatoes from the dirt, in the most effectual manner. The digger-point G is secured to the standards and mold-boards m m by bolts or screws r r and braces s s, connecting with the frame.

To change the machine from the potato-digger to a planter or hoe, detach the rear frame, leaving only the plows and the frame-work on the pole or tongue. The plow-points may be so adjusted or changed by reversing them that they serve to cover potatoes in planting, and may also make the most complete and efficient hoe or cultivator for dressing up the rows in all the various stages of their growth.

A more simple and a cheaper mode of constructing the frame for my combined potato-planter, hoe, and digger is shown in Figs. 5 and 6. The handles N N, which form the side pieces of the frame, extend forward over the shaft of the driving-wheels C C a sufficient distance to attach all of the potato-digging apparatus, as above described, the pole or tongue H being connected by the strap-irons j j to the journal-boxes h on the shaft d, so that the digging apparatus can be raised or lowered by lifting or depressing the handles, independent of the tongue or pole, the planting and hoeing apparatus being detached by releasing the strap-irons j j; and by changing the plow-points from the frame M to the slotted cross-bars I and J, and bolting on the handles o o onto the rear end of the pole H, a most complete and efficient planter, hoe, or cultivator is produced, as shown in Fig. 7.

Having thus described my improved combined potato-planter, hoe, and digger, what I claim as new, and desire to secure by Letters Patent, is—

1. The mode of operating the shaker F by an eccentric, b, and pitman f, so arranged and connected with the hanging irons j j that, by raising or lowering the handles to any given point, it does not prevent the free and easy working of the shaker F.

2. I claim the digging-point G, shaker F, finger-reel E, comb P, with the eccentric b, pinion a, and driving-wheel C, in combination with the journal-boxes h h, having projecting axles i i, for attaching the draft-irons j j, when constructed and arranged substantially as and for the purposes herein set forth.

In testimony whereof I hereunto subscribe my name in the presence of—

FRANCIS B. MARDEN.

Witnesses:
  J. B. WOODRUFF,
  GEO. C. GREEN.